(12) United States Patent
Syed et al.

(10) Patent No.: US 12,497,820 B2
(45) Date of Patent: Dec. 16, 2025

(54) SYSTEMS, COMPONENTS, AND METHODS FOR OPERATING MOVABLE BARRIER OPERATORS IN A HEADLESS MODE

(71) Applicant: The Chamberlain Group LLC, Oak Brook, IL (US)

(72) Inventors: Shawn Marghoob Syed, Lisle, IL (US); Steven Matthew Vanni, Woodridge, IL (US)

(73) Assignee: THE CHAMBERLAIN GROUP LLC., Oak Brook, IL (US)

( * ) Notice: Subject to any disclaimer, the term of this patent is extended or adjusted under 35 U.S.C. 154(b) by 88 days.

(21) Appl. No.: 18/392,688

(22) Filed: Dec. 21, 2023

(65) Prior Publication Data
US 2025/0207453 A1 Jun. 26, 2025

(51) Int. Cl.
*G08B 21/00* (2006.01)
*E05F 15/73* (2015.01)
*E05F 15/77* (2015.01)

(52) U.S. Cl.
CPC .............. *E05F 15/73* (2015.01); *E05F 15/77* (2015.01); *E05F 2015/765* (2015.01); *E05Y 2400/81* (2013.01)

(58) Field of Classification Search
CPC ..... E05F 15/73; E05F 15/77; E05F 2015/765; E05Y 2400/81
USPC ....................................................... 340/5.71
See application file for complete search history.

(56) References Cited

U.S. PATENT DOCUMENTS

| | | | | |
|---|---|---|---|---|
| 5,040,332 A | * | 8/1991 | Aquilina | F15B 15/082 92/88 |
| 8,436,713 B2 | * | 5/2013 | Hormann | E05F 15/668 318/275 |
| 2005/0272372 A1 | * | 12/2005 | Rodriguez | H04L 12/2803 455/66.1 |
| 2012/0297681 A1 | * | 11/2012 | Krupke | F16B 7/0413 49/324 |
| 2021/0350646 A1 | * | 11/2021 | Burroughs | G07C 9/00174 |
| 2023/0108988 A1 | * | 4/2023 | Learmonth | G01R 31/392 49/31 |

* cited by examiner

*Primary Examiner* — Mark S Rushing
(74) *Attorney, Agent, or Firm* — Dority & Manning, P.A.

(57) ABSTRACT

Systems, components, and methods are provided for operating a movable barrier operator are provided. A movable barrier operator includes a motor operably coupled to a movable barrier to control a position of the movable barrier; and control circuitry including wall controller inputs configured to be electrically coupled to a wall controller through a wall controller input circuit, wherein the control circuitry is configured to: receive a signal from the wall controller input circuit; determine that the wall controller is present in the wall controller input circuit based on the signal received from the wall controller input circuit; control the motor to operate in a first operating mode when the wall controller is determined to be present relative to the received signal; control the motor to operate in a second operating mode when the wall controller is determined to be absent relative to the received signal; and control the motor to operate in the first operating mode when the wall controller is absent and an additional criterion is met.

19 Claims, 5 Drawing Sheets

SYSTEMS, COMPONENTS, AND METHODS FOR OPERATING MOVABLE BARRIER OPERATORS IN A HEADLESS MODE

FIELD

The present disclosure relates generally to movable barrier operators, and more particularly to movable barrier operators configured to operate in a headless mode.

BACKGROUND

Movable barrier operator systems of various kinds are known in the art. In general, such systems serve to effect selective movement of a movable barrier (including but not limited to garage doors of various kinds, rolling shutters, and other horizontally or vertically sliding, moving, or pivoting doors, gates, arms, and the like) between at least a first position and a second position (such as between an open position and a closed position). Many such systems include a plurality of movable barrier operator system operational components. Such components serve in general to instigate active operation of the system and often (but not always) more specifically the active operation of the movable barrier itself. Examples of such operational components include but are not limited to movable barrier operators and movable barrier operator controllers (including wired and wireless controllers).

The operational strategies, component configuration and deployment, and feature sets of such systems continue to grow in complexity. At the same time, however, many users are unable or unwilling to make effective use of a challenging user interface. As a result, many modern movable barrier operator systems that support a variety of functions and operational states nevertheless offer only a very limited user interface. For example, only a very few buttons or knobs may be presented in a given prior art system. While such design structures do, in at least some sense, often succeed in maintaining potential user cognitive loading at or below some desired level, these same user interface conditions also potentially unduly constrain the breadth and/or depth of system functionality and capability. This, in turn, can ultimately lead to reduced user satisfaction.

Accordingly, improved movable barrier operational components and associated strategies are desired in the art. In particular, operational components and associated strategies that allow for easier use of a movable barrier system would be advantageous.

BRIEF DESCRIPTION

In accordance with the present disclosure various aspects and embodiments will be set forth in part in the following description.

In accordance with one embodiment, a movable barrier operator is provided. The movable barrier operator includes a motor operably coupled to a movable barrier to control a position of the movable barrier; and control circuitry including wall controller inputs configured to be electrically coupled to a wall controller through a wall controller input circuit, wherein the control circuitry is configured to: receive a signal from the wall controller input circuit; determine that the wall controller is present in the wall controller input circuit based on the received signal; control the motor to operate in a first operating mode when the wall controller is present; control the motor to operate in a second operating mode when the wall controller is absent, the second operating mode being different than the first operating mode; and control the motor to operate in the first operating mode when the wall controller is absent and an additional criterion is met.

In accordance with another embodiment, a method of adjusting an operating mode of a movable barrier operator is provided. The method includes detecting, via control circuitry of a movable barrier operator, operable communication with a wall controller, wherein the wall controller is electrically coupled to wall controller inputs of the control circuitry through a wall controller input circuit; controlling, with the control circuitry, a motor of the movable barrier operator to operate in a first operating mode in response to detecting operable communication with the wall controller; detecting, via the control circuitry, a loss of communication with the wall controller; and adjusting, with the control circuitry, the motor to operate in a second operating mode in response to the detected loss of communication with the wall controller, the second operating mode being different than the first operating mode.

In accordance with another embodiment, a method of adjusting an operating mode of a movable barrier operator is provided. The method includes controlling, with a control circuitry of the movable barrier operator, a motor of the movable barrier operator to operate at a first operating speed, the first operating speed being less than a second operating speed of the motor; detecting, via the control circuitry, a user override; and adjusting, with the control circuitry, the motor to operate at the second operating speed in response to the detected user override.

These and other features, aspects and advantages of the present invention will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

The detailed description that follows makes reference to the appended figures, in which.

DETAILED DESCRIPTION

Figure 1:
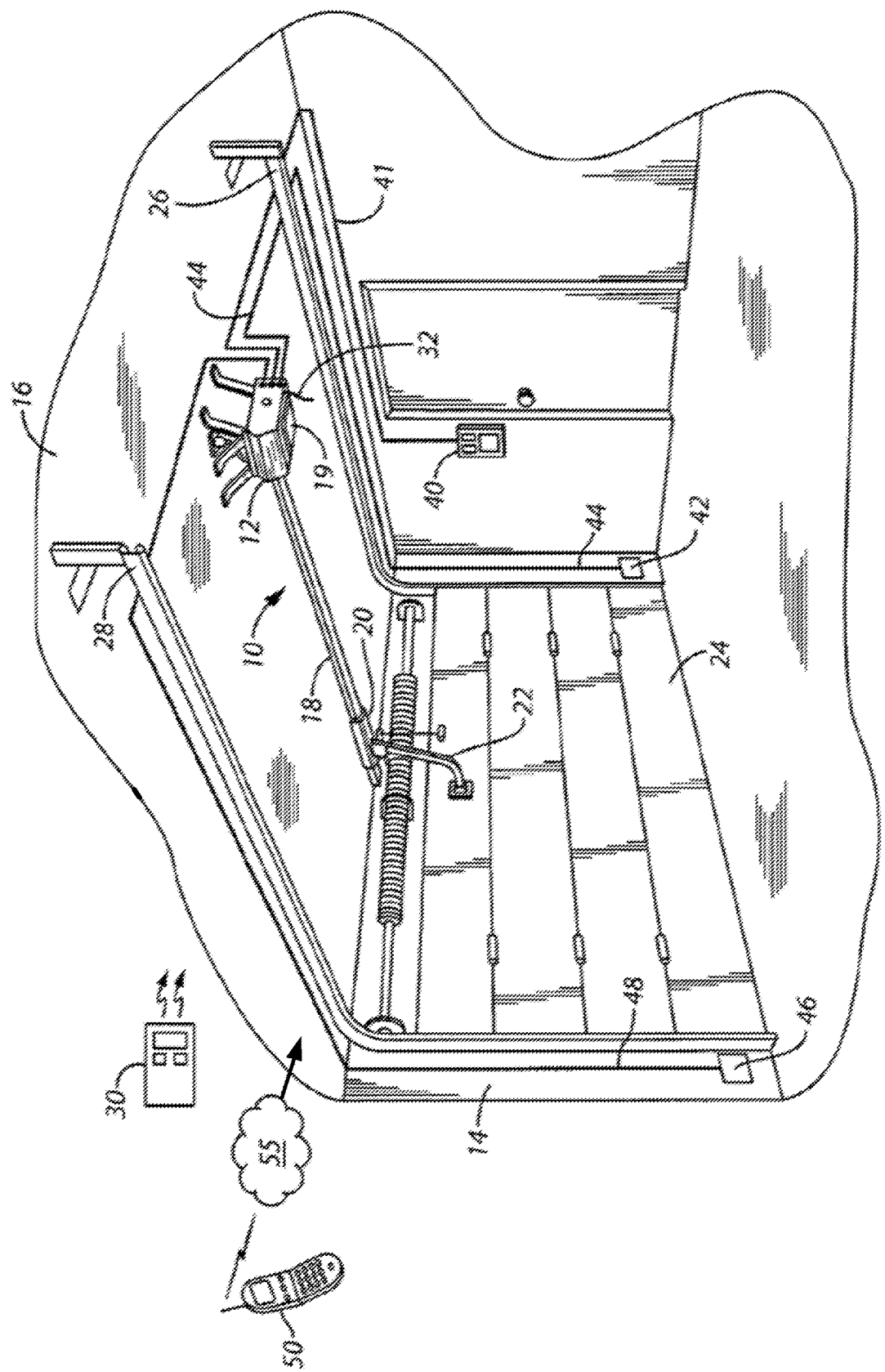
FIG. 1 is an illustration of a movable barrier system in accordance with embodiments of the present disclosure.

Reference now will be made in detail to embodiments of the present invention, one or more examples of which are illustrated in the drawings. The word "exemplary" is used herein to mean "serving as an example, instance, or illustration." Any implementation described herein as "exemplary" is not necessarily to be construed as preferred or advantageous over other implementations. Moreover, each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the disclosure.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises." "comprising," "includes," "including" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Terms of approximation, such as "about," "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Movable barrier operators are typically coupled to a wired wall controller that controls operation of the movable barrier operator in response to a user input at the wall controller. In general, systems, components, and methods described herein allow a movable barrier operator, such as a garage door opener, to operate in a headless mode where the movable barrier operator is not actively coupled to a wired wall controller. Active coupling between the movable barrier operator and the wired wall controller occurs where the movable barrier operator can receive signals from the wired wall controller. When the movable barrier operator is not actively coupled to the wired wall controller, the movable barrier operator may continue to be controlled using, e.g., a wireless controller, such as a wireless transmitter or a smartphone or other user device.

When actively coupled to a wired wall controller, movable barrier operators described herein typically operate in a first operating mode. When the wired wall controller is removed, control circuitry of the movable barrier operator adjusts the movable barrier operator to operate in a second operating mode different than the first operating mode. In some implementations, the second operating mode causes a motor of the movable barrier operator to operate at a slower speed than when the movable barrier operator is in the first operating mode. In some instances, the user may want to restore the movable barrier operator to the first operating mode (e.g., increased motor speed) but does not want to use the wired wall controller. By performing a user override, the movable barrier operator can be restored to the first operating mode without rewiring the wall controller to the movable barrier operator.

In some implementations, the movable barrier operator can include control circuitry coupled to wall controller inputs. The wall controller inputs are configured to electrically couple wires of a wall controller input circuit to the control circuitry. The wall controller is typically coupled to the control circuitry of the movable barrier operator via wires of the wall controller input circuit. In some implementations, the control circuitry detects the presence of (i.e., operable communication with) the wall controller and/or the user override at the wall controller inputs. For example, the control circuitry can detect when the wall controller inputs form a closed loop circuit. The closed loop circuit can be formed when the wall controller input circuit is coupled to the wall controller inputs with the wall controller present or when the user override (e.g., a short) is arranged at the wall controller inputs. Where user override is performed, and in response to detecting the user override, the control circuitry can adjust the movable barrier operator to the first operating mode despite the absence of the detected wall controller.

The control circuitry may communicate with one or more remote devices or servers through a network (e.g., a wireless network). The control circuitry can transmit notifications to the remote device(s) and/or server(s) with information associated with the movable barrier operator. The information can include, for example, a status associated with the current control mode of the movable barrier operator, a timestamp of control mode adjustments, a request for confirmation by a user of an updated control mode adjustment, instructions for further adjusting the movable barrier operator, etc.

In some instances, the user may wish to recouple the movable barrier operator to a wall controller after the wall controller has been previously uncoupled from the movable barrier operator. For example, the wall controller may have been damaged during use and require replacement. A replacement wall controller may not be readily available to install at the movable barrier operator. The user does not want to operate the movable barrier operator at reduced operating speeds while waiting for the replacement controller and instead performs a user override to temporarily restore the movable barrier operator to the first operating mode. Once the replacement wall controller is received, the user can install the replacement wall controller by coupling the wall controller input circuit associated with the replacement wall controller to the wall controller inputs. The control circuitry of the movable barrier operator can detect the wall controller at the wall controller inputs and cause the movable barrier operator to operate in the first operating mode. It should be understood that in some instances the replacement wall controller may be the original wall controller, for example, where the original wall controller was intentionally removed by the user and is subsequently reinstalled.

In some implementations, detecting the replacement wall controller is performed when the movable barrier operator undergoes a power cycle where power to the movable barrier operator is temporarily terminated and subsequently restored. The control circuitry can be configured to query the wall controller inputs for presence of the wall controller input circuit (or user override) during or after the power cycle process. If the wall controller input circuit is detected as a closed loop circuit, the control circuitry can adjust or maintain the movable barrier operator in the first operating mode. If the wall controller input circuit is absent, the control circuitry can adjust or maintain the movable barrier operator in the second operating mode. In some implementations, detection of the replacement wall controller can occur without a power cycle of the movable barrier operator (i.e., the wall controller can be hot swapped). For example, the control circuitry can periodically query the wall controller inputs to determine the presence of the wall controller input circuit (or user override). The control circuitry can adjust the operating mode according to the results of the query.

Referring now to the drawings, FIG. 1 depicts an example movable barrier system 10 including a movable barrier operator 12, here a head unit of a garage door opener, mounted within a garage 14 and employed for controlling the opening and closing of the movable barrier 24, here a garage door. The movable barrier operator 12 can be mounted to the ceiling 16 or a wall of the garage 14. For instance, the movable barrier operator 12 can be a trolley operator or a jackshaft operator. The movable barrier operator 12 includes a motor and an operator controller for outputting control signals to and/or controlling electrical power supplied to the motor. The operator controller for the movable barrier system 10 responds to various inputs by starting and stopping the motor, which is used to move the movable barrier 24, and by turning a light 19 on and off. Extending from the movable barrier operator 12 is a rail 18, e.g., a rail with a rectangular cross-sectional profile, having a releasable trolley 20 attached thereto and an arm 22 extending from the trolley 20 and coupled to the movable barrier 24 positioned for movement along a pair of door tracks 26 and 28. The movable barrier operator 12 transfers the garage door 24 between open and closed positions for allowing access to and from the garage 14.

For various purposes, an optical emitter 42 and optical detector 46 are provided. These are coupled to the movable barrier operator 12 by a pair of wires 44 and 48 or through one or more wireless transmission protocols, such as WiFi, Bluetooth, or the like. The emitter 42 and detector 46 are used to sense an object therebetween which interrupts an infrared or other optical beam across the opening between emitter 42 and detector 46. To provide such operation, the controller responds to the detector 46 upon beam interruption and will stop and/or reverse and open the door if an obstruction is sensed in the doorway.

At least one wireless transmitter unit 30 can send signals to one or more antennas 32 positioned in, on, or extending from the movable barrier operator 12. The antenna 32 is coupled to a receiver located within the movable barrier operator 12. A wall controller 40, which may include any number of actuators such as buttons or switches, is mounted on a wall of the garage 14. The wall controller 40 communicates with the movable barrier operator 12 through a direct physical wired wall controller input circuit 41 to the movable barrier operator 12 using any commonly known method of communication, including serial bus communication. A variety of other communication options may be available to allow a user to communicate with and control the movable barrier system 10. By one example, a mobile communication device 50 is configured to send signals through a wireless communication network 55 to the movable barrier operator 12 to control operation of the movable barrier system 10. Mobile communication devices 50 such as mobile phones and other mobile devices are known.

Figure 2:
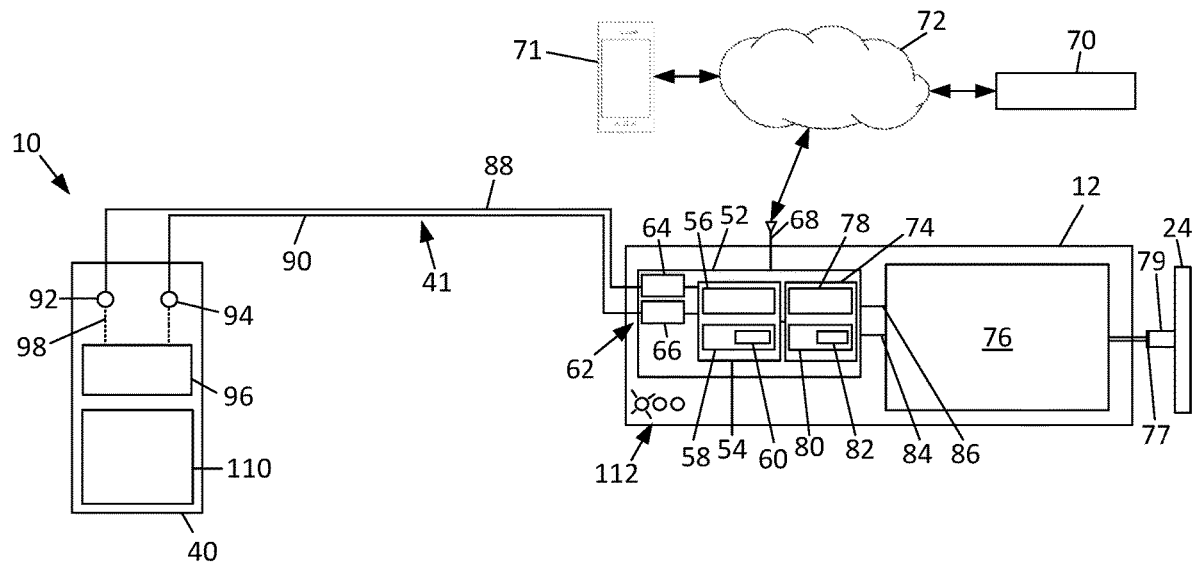
FIG. 2 is a schematic of a portion of the movable barrier system in accordance with embodiments of the present disclosure.

With reference to FIG. 2, a portion of the system 10 including the movable barrier operator 12 and the wall controller 40 in accordance with an embodiment will be described. The movable barrier operator 12 includes control circuitry 52 configured to control one or more operational parameters of the movable barrier operator 12. In one implementation, the one or more operational parameters include a speed at which the movable barrier 24 is raised and lowered. The speed of the movable barrier 24 may be adjusted as described hereinafter in view of an operating mode of the movable barrier operator 12.

In some implementations, the control circuitry 52 includes a single control board, such as a single printed control board (PCB) (see, e.g., FIG. 3) disposed in, on, or near the movable barrier operator 12. In other implementations, the control circuitry 52 can be comprised of a plurality of physically distinct elements operating together. The physically distinct elements can communicate with one another through wired and/or wireless communication protocols.

In an embodiment, the control circuitry 52 includes a main controller 54 having one or more processors 56 coupled to memory 58. The processor(s) 56 can be any suitable processing device (e.g., a control circuitry, a processor core, a microprocessor, an application specific integrated circuit, a field programmable gate array, a controller, a microcontroller, etc.) and can be one processor or a plurality of processors that are operatively connected. The memory 58 can include one or more non-transitory computer-readable storage media, such as RAM, ROM, EEPROM, EPROM, one or more memory devices, flash memory devices, etc., and combinations thereof. The memory 58 can store information that can be accessed by the processor(s) 56. For instance, the memory 58 (e.g., one or more non-transitory computer-readable storage mediums, memory devices) can include computer-readable instructions 60 that can be executed by the processor(s) 56. The instructions 60 can be software, firmware, or both written in any suitable programming language or can be implemented in firmware or hardware. Additionally, or alternatively, the instructions 60 can be executed in logically and/or virtually separate threads on processor(s) 56. For example, the memory 58 can store instructions 60 that when executed by the processor(s) 56 cause the processor(s) 56 to perform operations such as any of the operations and functions as described herein.

The control circuitry 52 can include wall controller inputs 62. The wall controller inputs 62 can include any circuits, components, software, etc. that allow the control circuitry 52 to communicate with the wall controller 40. In some implementations, the wall controller inputs 62 can include for example, one or more of a communications controller, receiver, transceiver, transmitter, port, conductors, software and/or hardware for communicating data/information. In one implementation, the wall controller inputs 62 include a first terminal 64 and a second terminal 66. The first and second terminals 64 and 66 can be configured to engage external wires, such as those of the wall controller input circuit 41, and allow for communication in at least one direction between the main controller 54 and the wall controller 40. The first and second terminals 64 and 66 can be in communication with the main controller 54 such that signals received from the wall controller input circuit 41 at the wall controller inputs 62 are transmitted to the main controller 54.

The control circuitry 52 can also include a communication interface 68 configured to communicate with a remote server 70 and/or a user device 71 through a network, such as a wireless network 72. The communication interface 68 can include any circuits, components, software, etc. for communicating via one or more networks (e.g., network 72). In some implementations, the communication interface 68 can include one or more of a communications controller, receiver, transceiver, transmitter, port, conductors, software and/or hardware for communicating data/information.

The network 72 can be any type of network or combination of networks that allows for communication between devices. In some implementations, the network 72 can include one or more of a local area network, wide area network, the Internet, secure network, cellular network, mesh network, peer-to-peer communication link and/or some combination thereof and can include any number of wired or wireless links. Communication over the network 72 can be accomplished, for instance, via a network interface using any type of protocol, protection scheme, encoding, format, packaging, etc.

The control circuitry 52 further includes a motor controller 74. The motor controller 74 is in communication with a motor 76 of the movable barrier operator 12. The motor controller 74 is configured to control one or more operating parameters of the motor 76, e.g., in response to user input at the wall controller 40. The motor controller 74 can include one or more processors 78 coupled to memory 80. The processor(s) 78 can be any suitable processing device and can be one processor or a plurality of processors that are operatively connected. The memory 80 can include one or more non-transitory computer-readable storage media, such as RAM, ROM, EEPROM, EPROM, one or more memory devices, flash memory devices, etc., and combinations thereof. The memory 80 can store information that can be accessed by the processor(s) 78. For instance, the memory 80 can include computer-readable instructions 82 that can be executed by the processor(s) 78. The instructions 82 can be software, firmware, or both written in any suitable programming language or can be implemented in firmware or hardware. Additionally, or alternatively, the instructions 82 can be executed in logically and/or virtually separate threads on processor(s) 78. For example, the memory 80 can store instructions 82 that when executed by the processor(s) 78 cause the processor(s) 78 to perform operations such as any of the operations and functions as described herein.

The motor 76 can include, for example, an alternating current or direct current motor. The motor 76 interacts with the movable barrier 24 through a drive system 77 including, for example, a belt or cable disposed in an infinite loop. The motor controller 74 utilizes a plurality of relays or other electromechanical, electrical, or electronic features that feed electrical current or motor drive signals (e.g., pulse width modulation 'PWM') or commands on lines 84 and 86 to the motor 76. The motor 76 can output rotational energy to a gear or sprocket 79 that moves the drive system 77 to raise and lower the movable barrier 24.

Operation of the motor 76 is controlled by the motor controller 74 using, for example, proportional-integral-derivative (PID) controls. The PID controls utilize a control loop feedback mechanism to iteratively adjust one or more parameters, such as current or voltage, supplied to the motor 76 to achieve a desired operating parameter. The motor controller 76 can change the operating speed of the motor 76 through PID control, e.g., in response to instructions from another portion of the control circuitry 52, such as the main controller 54, by changing the current or voltage supplied to the motor 76.

The main controller 54 is in communication with the wall controller 40 through the wall controller input circuit 41. The wall controller input circuit 41 can be a physical wired electrical circuit formed by a first wire 88 and a second wire 90. The first wire 88 can extend from the first terminal 64 of the movable barrier operator 12 to a first terminal 92 of the wall controller 40. The second wire 90 can extend from the second terminal 66 of the movable barrier operator 12 to a second terminal 94 of the wall controller 40. The first and second terminals 92 and 94 of the wall controller 40 can each include an exposed contact, such as a bolt or a screw, that receives and electrically couples the first and second wires 88 and 90 to the wall controller 40. The first and second terminals 92 and 94 can be electrically coupled together within the wall controller 40, e.g., through a switch 96, such as a switch associated with one or more controllable implements (e.g., buttons) of the wall controller 40, and one or more internal wires 98.

The wall controller input circuit 41 is configured to provide power from the movable barrier operator 12 to the wall controller 40 through the wall controller input circuit 41. The wall controller input circuit 41 is configured to transmit signals from the wall controller 40 to the movable barrier operator 12 (e.g., in response to user input at one or more controllable implements of the wall controller 40) and vice-versa.

Figure 3:
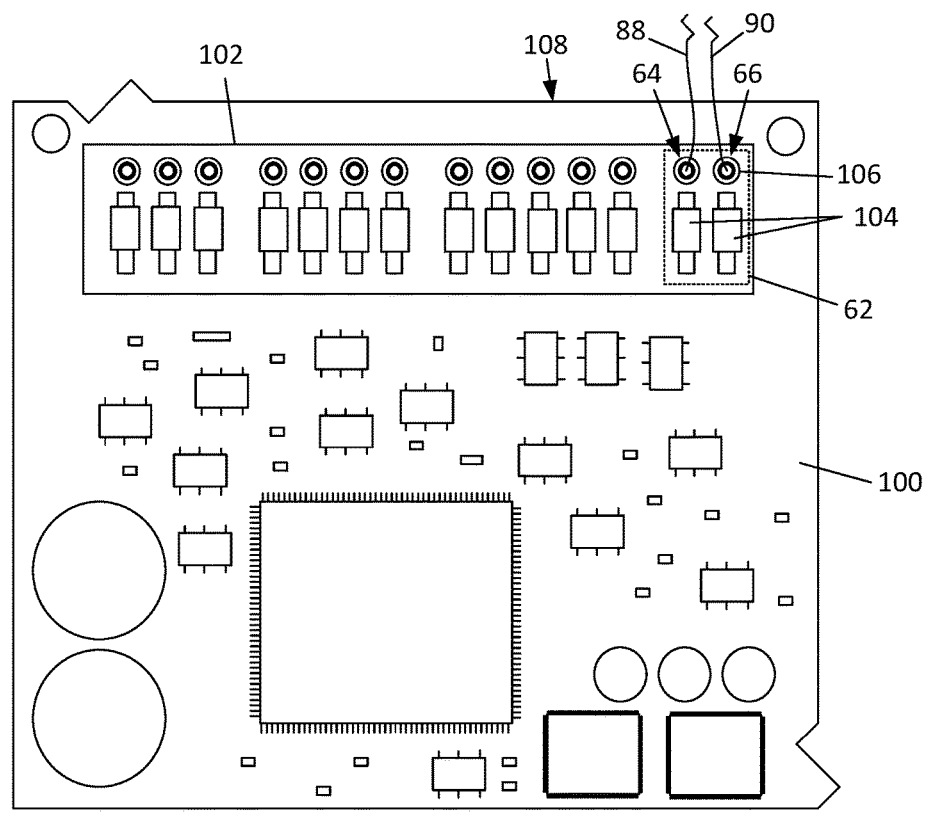
FIG. 3 is a top view of a portion of control circuitry associated with a movable barrier operator of the movable barrier system in accordance with embodiments of the present disclosure.

FIG. 3 illustrates a schematic of a portion of a printed circuit board (PCB) 100 configured to support aspects of the control circuitry 52 of the movable barrier operator 12 as seen in an example embodiment. The PCB 100 generally includes one or more layers of conductors separated by insulating layers on which electronic components are mounted. The electronic components can include, for example, integrated circuits, transistors, diodes, resistors, capacitors, inductors, and transformers electrically interconnected to form electronic circuits. Terminal connectors 102 may be arranged on, or coupled to, the PCB 100 to allow for plug-in connectivity of external wires, such as the first and second wires 88 and 90. At least one of the terminal connectors 102 can include a user-engageable interface 104 engageable by a user to selectively open an entrance 106 to the terminal connector 102 to allow for insertion or removal of an external wire from the entrance 106. The terminal connectors 102 may be disposed at, or near, an edge 108 of the PCB 100 to facilitate easier connection of external wires to the terminal connectors 102. The terminal connectors 102 can be in electric communication with one or more of the electronic components of the PCB 100 to permit input and output signals from the external wires to reach the electronic components of the PCB 100. The terminal connectors 102 can include the wall connector inputs 62, i.e., the first and second terminals 64 and 66.

In an embodiment, the wall controller 40 is electrically coupled to the movable barrier operator 12 through the wall controller input circuit 41 as part of an initial setup of the system 10. With the wall controller 40 electrically coupled to the movable barrier operator 12, the user may interact with the wall controller 40 to initialize operation of the system 10. For example, the user may interact with the switch 96 of the wall controller 40 to activate the motor 76 and cause the movable barrier 24 (FIG. 1) to raise and lower. The user can set travel limits for the movable barrier 24 (e.g., an upper travel limit and a lower travel limit), set up the optical emitter 42 and optical detector 46, set up door type or drum/sprocket type, configure the system 10 with a local network (such as a WiFi access point), configure entrapment devices and cable tension monitor(s) (CTMs), change operation modes, configure timers or timer secure modes, learn transmitters and gateways, configure battery options (e.g., for power failure or low battery conditions), change menu language, perform factory reset, read system information (e.g., configuration information, firmware information, service cycle counter information, battery option configuration information, etc.), or perform one or more initial setup procedures. In some implementations, initial setup of the system 10 may only be performed with the wall controller 40 electrically coupled to the movable barrier operator.

As described above, the wall controller input circuit 41 forms a closed state (closed circuit) when the movable barrier operator 12, the wall controller 40, and the first and second wires 88 and 90 are coupled together. With the wall controller input circuit 41 in the closed state, the wall controller 40 is able to control operation of the movable barrier operator 12. However, in certain instances the closed state may be interrupted, resulting in the movable barrier operator 12 losing communication with the wall controller 40 and vice-versa. The wall controller 40 may not affect the movable barrier operator 12 when communication is lost with the control circuitry 52.

Figure 4:
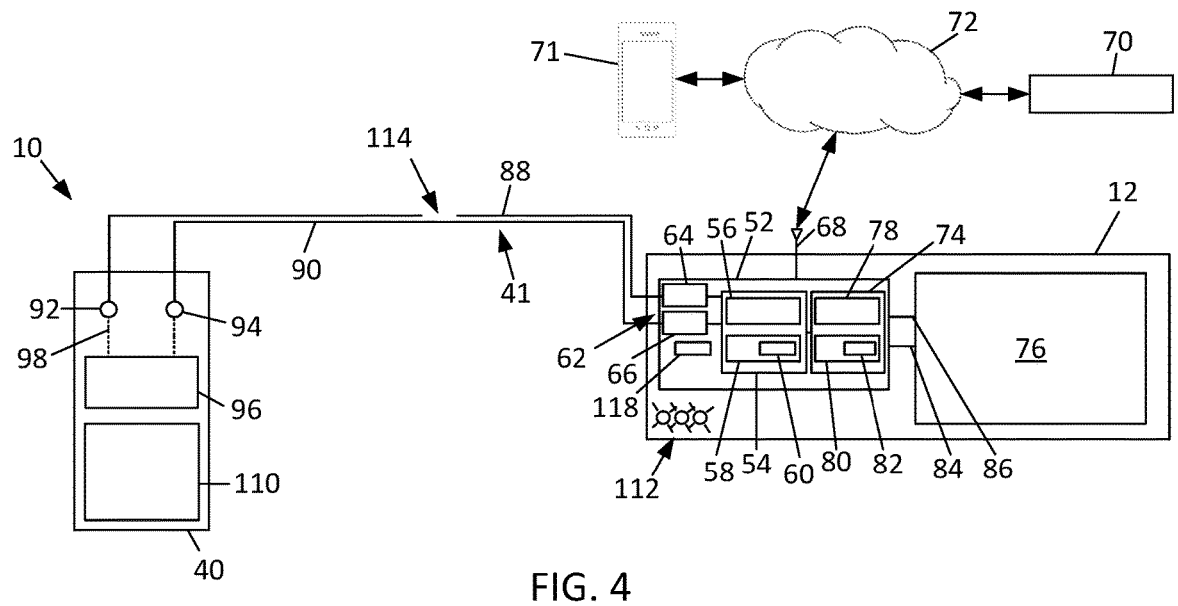
FIG. 4 is a schematic of a portion of the movable barrier system with a break in a wall controller input circuit in accordance with embodiments of the present disclosure.

FIG. 4 is a schematic of a portion of the system 10 including the movable barrier operator 12 and the wall controller 40 in accordance with one or more implementations where the wall controller input circuit 41 is interrupted (open) as a result of an accidental break 114 in the first wire 88. While the break 114 is depicted approximately midway along a length of the first wire 88, the break 114 may occur at another location along the first wire 88, along the second wire 90, within internal wires 98 of the wall controller 40, at any one or more of the terminals 64, 66, 92. 94, or even within the control circuitry 52 of the movable barrier operator 12 (such as at the wall controller inputs 62). Accidental breaks 114 in the wall controller input circuit 41 typically occur as a result of physical damage to the wall controller input circuit 41 (e.g., cutting of one of the wires 88 or 90) or component failure (e.g., shorting of or disconnection from the terminals 92 or 94 of the wall controller 40).

Figure 5:
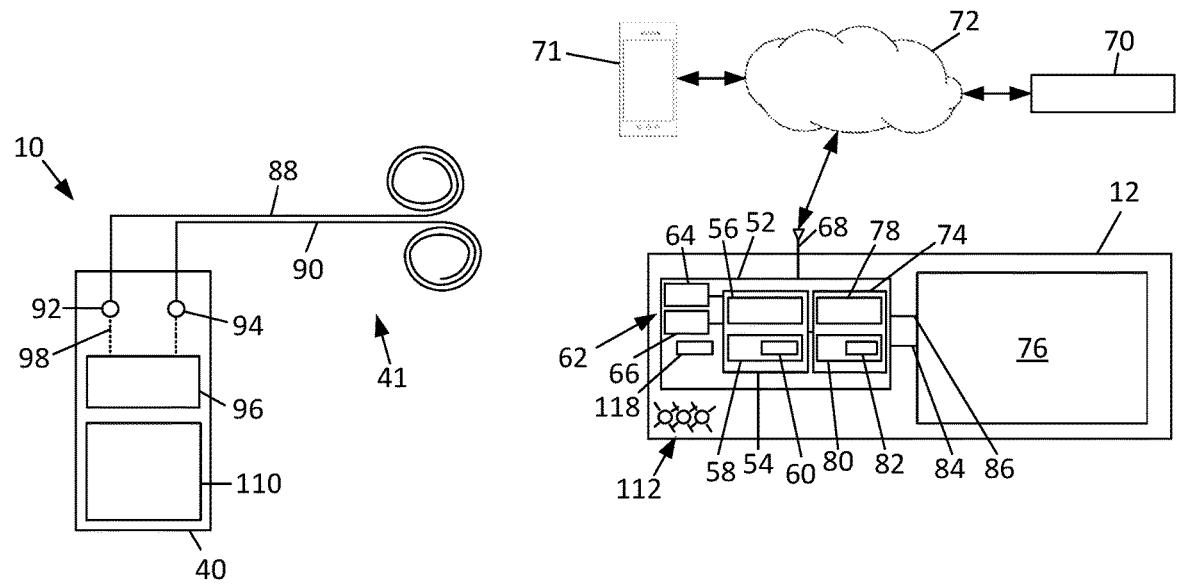
FIG. 5 is a schematic of a portion of the movable barrier system with an intentionally disconnected wall controller input circuit in accordance with embodiments of the present disclosure.

FIG. 5 is a schematic of a portion of the system 10 including the movable barrier operator 12 and the wall controller 40 in accordance with one or more implementations where the wall controller 40 is intentionally disconnected from the movable barrier operator 12. As previously described, the wall controller 40 may be intentionally disconnected from the movable barrier operator 12 due to environmental constraints, for security purposes, or in response to other user-driven considerations. This may be particularly true for commercial applications, such as warehouses, loading docks, etc. In some implementations, the wall controller 40 may be intentionally disconnected from the movable barrier operator 12 by disconnecting the first and second wires 88 and 90 from the first and second terminals 64 and 66 of the control circuitry 52. In other implementations, the wall controller 40 may be disconnected from the first and second wires 88 and 90 while the first and second wires 88 and 90 remain coupled to the first and second terminals 64 and 66 of the control circuitry 52. In some instances, the wall controller 40 may be entirely removed from the environment after being disconnected from the control circuitry 52.

The control circuitry 52 of the movable barrier operator 12 can be configured to detect, such as automatically detect, presence of (i.e., operable communication with) the wall controller 40 at the wall controller inputs 62. For example, in some implementations the control circuitry 52 can detect whether the wall controller input circuit 41 forms a closed loop circuit or an open circuit. When the wall controller 40 is present and in communication with the control circuitry 52, the control circuitry 52 detects a closed loop circuit at the wall controller inputs 62. Conversely, when the wall controller 40 is absent or the wall controller input circuit 41 is broken, the control circuitry 52 detects an open state at the wall controller inputs 62.

Detection of the state of the wall controller input circuit 41 may be performed in a number of different ways. In one implementation, the wall controller inputs 62 can have a detectable first characteristic (e.g., a first resistance) when the wall controller input circuit 41 is in an open state and a second detectable characteristic (e.g., a second resistance) when the wall controller input circuit 41 forms a closed loop circuit coupled to the wall controller inputs 62. The first and second characteristics are different from one another. The control circuitry 52 can sense changes between the first and second characteristics and determine a state of the wall control input circuit 41 in response to the sensed changes. For example, in response to sensing decreased resistance at the wall controller inputs 62, the control circuitry 52 can determine that the wall controller input circuit 41 is a closed state, and thus that the wall controller 40 is electrically coupled to the movable barrier operator 12 through the wall controller input circuit 41. Conversely, in response to sensing increased resistance at the wall controller inputs 62, the control circuitry 52 can determine that the wall controller input circuit 41 is open, and thus that the wall controller 40 is not electrically coupled to the movable barrier operator 12.

In some implementations, the control circuitry 52 can utilize a fuzzy logic algorithm to automatically detect the state of the wall controller inputs 62. For example, the algorithm can receive input variables indicative of an open or closed state. The input variables can include, for example, impedance, power, reactance, resistance, and the like as exhibited between the first and second terminals 64 and 66. The processor(s) 56 may convert or otherwise process the input variables to determine the state of the wall controller inputs 62. It should be understood that the above examples are merely illustrative and may be replaced by other detection methodologies deployed by the control circuit 52.

In some instances, the movable barrier operator 12 may be configured to operate differently based on whether the control circuitry 52 is in communication with the wall controller 40. For example, at times when the movable barrier operator 12 is in communication with the wall controller 40, the movable barrier operator 12 may be configured to default to a first operating mode. At other times, when the movable barrier operator 12 is not in communication with the wall controller 40, the movable barrier operator 12 may be configured to default to a second operating mode that is different than the first operating mode. For example, the movable barrier operator 12 may be configured to control the motor 76 to operate at a first speed in the first operating mode and a second speed in the second operating mode. The first and second speeds may be different from each other. For example, the first speed may be greater than the second speed. By way of non-limiting example, the first speed may be approximately twice the second speed. Thus, the movable barrier 24 may default to operating at half speed when the control circuitry 52 loses communication with the wall controller 40.

Operating the movable barrier operator 12 with a different operating mode when the wall controller 40 is not detected by the control circuitry 52 may provide a visual indication or notification that the wall controller 40 is not coupled to the movable barrier operator 12 and signal to those nearby individual or individuals (and who are familiar with a normal or typical operation of the movable barrier operator) that action is to be taken to restore full functionality of the wall controller 40. For example, the wall controller input circuit 41 may be inspected for damage and the wall controller 40 may be removed from the wall and inspected to ensure the first and second wires 88 and 90 are actively coupled to the terminals 92 and 94 of the wall controller 40. However, in some instances the wall controller 40 may be intentionally detached from the control circuitry 52. For example, some environments, such as loading docks and warehouses, may lack sufficient wall space for mounting a wall controller 40. Other environments may desire removal of wall controllers 40, e.g., for security purposes. In these example environments, the wall controller 40 is intentionally removed from the wall controller input circuit 41 after the movable barrier operator 12 is set up and initialized.

Figure 6:
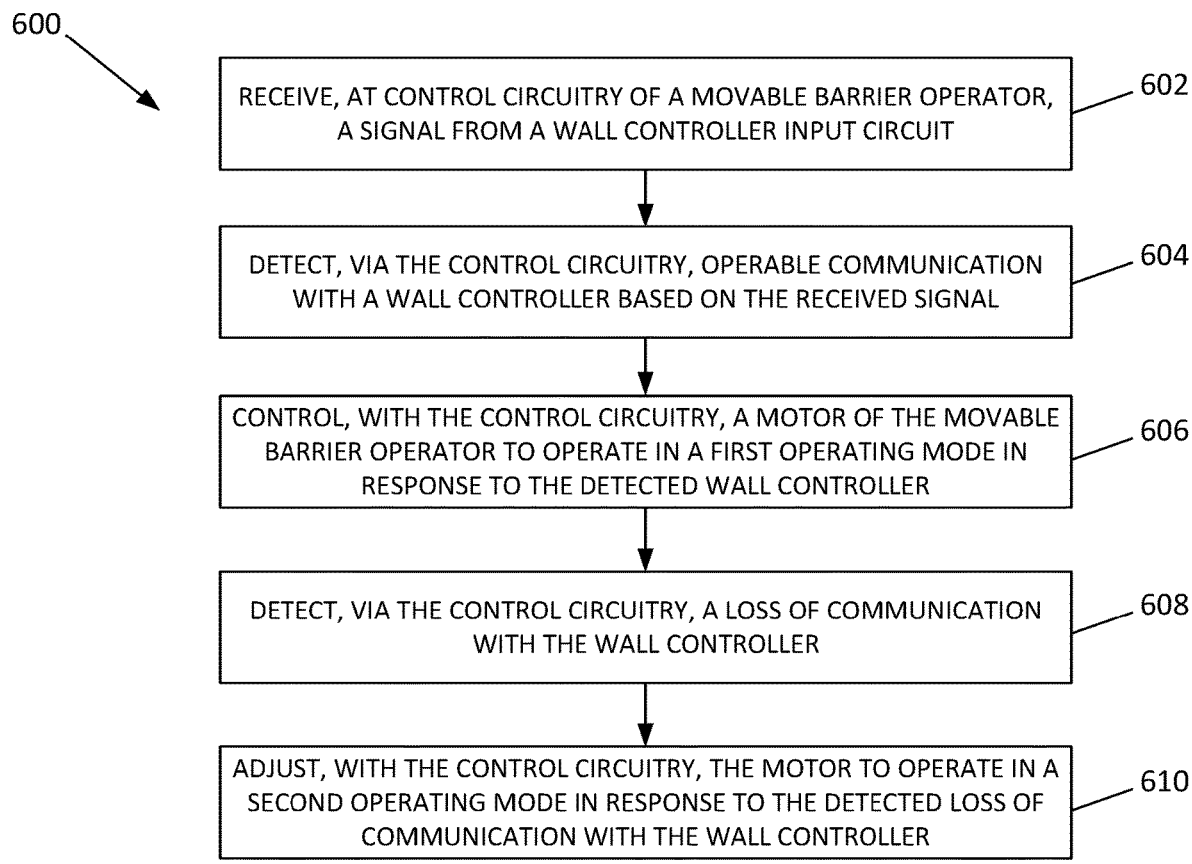
FIG. 6 is a flowchart of a method of adjusting an operating mode in the movable barrier operator in accordance with embodiments of the present disclosure.

FIG. 6 is a flow chart of a method 600 of adjusting, via control circuitry of a movable barrier operator, an operating mode of the movable barrier operator in accordance with an embodiment. In general, the method 600 will be described with reference to a system including the wall controller 40 and the movable barrier operator 12 described above with reference to FIGS. 1 to 5. In addition, although FIG. 6 depicts steps performed in a particular order for purposes of illustration and discussion, the method discussed herein is not limited to any particular order or arrangement. One skilled in the art, using the disclosure provided herein, will appreciate that various steps of the method disclosed herein can be omitted, rearranged, combined, and/or adapted in various ways without deviating from the scope of the present disclosure.

The method 600 can include receiving 602, at control circuitry of a movable barrier operator, a signal from a wall controller input circuit. In one implementation, the signal can be received 602 at wall controller inputs of the control circuitry. When the wall controller input circuit is interrupted (open), the signal may not be received at the control circuitry. When the wall controller input circuit is uninterrupted (closed), the signal may be received at the control circuitry. In some implementations, the received signal can include electrical signals from the wall controller. The electrical signal can include control signals indicative of a user's input at the wall controller.

The method 600 further includes detecting 604, via control circuitry, operable communication between the wall controller and the movable barrier operator based on the signal that was received relative to operation 602. As described above, the wall controller input circuit may be formed from a combination of the movable barrier operator, the wall controller, and first and second wires. The wall controller input circuit is in a closed loop when the movable barrier operator, the wall controller, and the first and second wires are coupled together. Detection 604 of the wall controller may occur when the wall controller input circuit forms a closed loop. For example, the wall controller input circuit can have a detectible first characteristic (e.g., a first resistance) when the wall controller input circuit is in an open loop and a detectible second characteristic (e.g., a second resistance) when the wall controller input circuit is in a closed loop. The detectible first and second characteristics are different from one another. The control circuitry of the movable barrier operator can sense changes between the detectible first and second characteristics and determine a state of the wall control input circuit in response to the sensed changes. For example, in response to sensing decreased resistance in the wall control input circuit, the control circuitry can determine that the wall controller input circuit is closed, and thus that the wall controller is present or not present—i.e., operably coupled to the movable barrier operator through the wall controller input circuit. It should be understood that the above example is merely illustrative and that the detection methodology may be replaced by other processes or methods.

The method 600 can include controlling 606, with the control circuitry, a motor of the movable barrier operator to operate in a first operating mode in response to detecting 604 operable communication with the wall controller. For example, the control circuitry can include a motor controller configured to control one or more operating parameters of the motor of the movable barrier operator. The motor controller can include control logic, such as a PID controller, that employs feedback in a closed loop mechanism to modulate current flow to the motor. The motor controller can supply the motor with a first current flow in response to being instructed to control the motor in the first operating mode.

In some implementations, the control circuitry can include a main controller in communication with the wall controller inputs. The motor controller can be in communication with the main controller such that the motor controller receives instructions from the main controller. Controlling 606 the motor can be performed by first determining, at the main controller, that the wall controller is in operable communication with the control circuitry. In response to determining, at the main controller, that the wall controller is in operable communication with the control circuitry, the main controller can communicate with the motor controller and provide instructions to the motor controller to control the motor in accordance with the first control mode (e.g., at the first current flow). The motor controller can receive the instructions from the main controller and deploy PID control to maintain the motor in the first operating mode. The motor controller can continue to operate the motor in the first operating mode until such time that the motor controller receives a subsequent instruction from the main controller to adjust the control mode.

In an embodiment, the method 600 can further include detecting 608, via the control circuitry, a loss of communication with the wall controller. Loss of communication can occur, for example, in response to a broken wire in the wall controller input circuit, damage to the wall controller, damage to the movable barrier operator (e.g., at the wall controller input), removal of the wall controller, or any combination thereof. In some instances, detecting 608 loss of communication with the wall controller may occur accidentally, e.g., as a result of damage to the wall controller input circuit. In other instances, detecting 608 loss of communication with the wall controller may occur as a result of a user or installation technician intentionally removing the wall controller from the wall controller input circuit. For instance, the user may intentionally remove one or both of the first or second wires of the wall controller input circuit from the wall controller inputs of the movable barrier operator.

In some implementations, the control circuitry can automatically detect 608 loss of communication with the wall controller upon interruption of the wall controller input circuit. For example, resistance at the wall controller inputs of the movable barrier operator can increase suddenly as a result of the interrupted (open) wall controller input circuit. The control circuitry of the movable barrier can detect the sudden increase of resistance at the wall controller inputs in real time and determine loss of communication with the wall controller in response thereto. In other implementations, the control circuitry may periodically (or otherwise infrequently) query the wall controller inputs (e.g., via one or more pings or the like) to verify ongoing connection to the wall controller input circuit and detect the absence of the wall controller accordingly. In another implementation, the wall controller may be configured to output a periodic or regular heartbeat signal that indicates to the movable barrier operator that the wall controller is present and operational.

The method 600 can further include adjusting 610, with the control circuitry, the motor to operate in a second operating mode in response to the detected loss of communication with the wall controller. As previously described, the second operating mode is different than the first operating mode. For instance, the second operating mode may result in slower movement of the movable barrier as compared to the first operating mode. In implementations where the motor controller controls the motor using PID control, the motor controller can adjust a relative amount of current flow to the motor in response to receiving an instruction, e.g., from the main controller, to adjust 610 the motor to operate in the second operating mode. The motor controller can then operate the motor in the second operating mode to raise and lower the movable barrier until such time that the motor controller receives a subsequent instruction from the main controller to adjust the control mode of the motor. Thus, the movable barrier operator can continue operating in the second control mode indefinitely, or until such time that return to the first control mode is warranted (e.g., based on reconnection of the wall controller to the wall controller input circuit or a user override condition described in greater detail below).

In some implementations, adjusting 610 the motor to operate in the second operating mode may occur instantaneously, or substantially instantaneously, with detecting 608 the loss of communication with the wall controller. For example, the movable barrier operator may be in the process of moving (e.g., raising or lowering) the movable barrier when detection 608 of the loss of communication with the wall controller occurs. In this type of situation, the motor controller can immediately adjust 610 the motor to operate in the second operating mode prior to the movable barrier reaching its intended position. That is, adjustment 610 from the first operating mode to the second operating mode can occur while the movable barrier is in motion. In other implementations, adjustment 610 of the motor to operate in the second operating mode may be delayed from the time of detection 608. For example, when detection 608 occurs while the movable barrier is actively being raised or lowered, the adjustment 610 may not occur until a subsequent action is taken. That is, the movable barrier operator can finish the current raising/lowering process without the control circuitry adjusting 610 the motor from the first operating mode to the second operating mode. The control circuitry can adjust 610 the motor to operate in the second operating mode for the next subsequent raising/lowering action.

In an embodiment, the control circuitry is configured to transmit a notification to a remote device or server in response to detecting 608 the loss of the wall controller and/or in response to adjusting 610 the motor from the first operating state to the second operating state. The transmitted notification can indicate to the remote device or server that an operational change to the system has occurred. The transmitted notification can include information associated with the movable barrier operator. The information can include, for example, a status associated with the current control mode of the movable barrier operator, a timestamp of control mode adjustments, a request for confirmation by a user of an updated control mode adjustment, instructions for further adjusting the movable barrier operator, etc.

In the method 600 described above, the control circuitry causes the movable barrier operator to operate in a second operating mode in response to detecting a loss of communication with the wall controller. However, it may not always be desirable to operate the movable barrier operator in the second operating mode when communication with the wall controller is lost. Thus, systems and methods set forth in this disclosure may be configured (e.g., by a user) to restore the movable barrier operator to the first operating mode while the system is in a condition associated with the second operating mode (i.e., without the wall controller present in the wall controller input circuit). Restoration of the first operating mode when the wall controller is not present may be performed via a user override that affects one or more criterion associated with the system.

Figure 7:
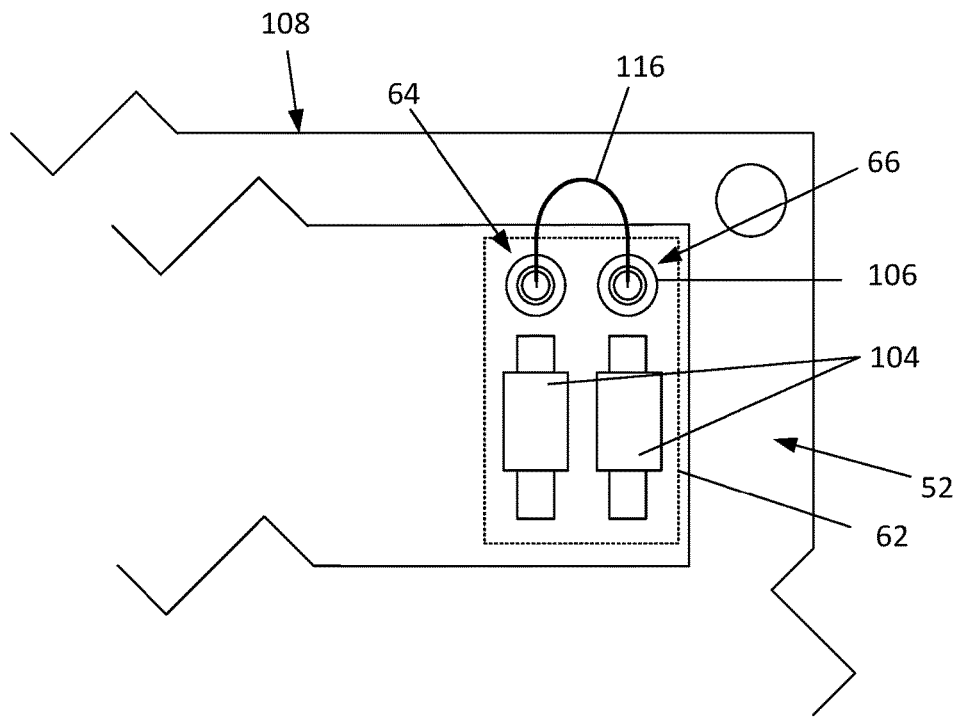
FIG. 7 is a top view of a portion of the control circuitry including a user override in accordance with embodiments of the present disclosure.

FIG. 7 illustrates an example user override implemented at the wall controller inputs 62, i.e., the first and second terminals 64 and 66, of the control circuitry 52 to restore the movable barrier operator 12 to the first operating mode despite the absence of the wall controller in the wall controller input circuit. The depicted user-override includes a short, short-circuit, or conductive bridge between the first and second terminals 64 and 66. The short can be formed by a wire 116 bridging the first and second terminals 64 and 66. A user can introduce the wire 116 to the first and second terminals 64 and 66, e.g., after detaching the wall controller input circuit 41 from the wall controller inputs 62.

In some implementations, the control circuitry 52 can automatically detect the presence of the user override (e.g., the wire 116). For example, as described above, resistance measured at the wall controller inputs 62 increases as a result of an interrupted (open) wall controller input circuit 41. Shorting the first and second terminals 64 and 66 together decreases resistance at the wall controller inputs 62. This decrease in resistance can be detected by one or more sensing components 118 of the control circuitry and measured (and optionally compared to a threshold value), e.g., by the processor(s) 56 of the control circuitry 52. In response to the detected and measured decrease in resistance, the control circuitry 52 can identify the presence of a user-configured bypass (e.g., the short), determine intent of the user to engage the override condition, and restore operation of the movable barrier operator to the first operating mode.

In some implementations, the control circuitry 52 can utilize a fuzzy logic algorithm to automatically detect the presence of the user override, e.g., the short. For example, the algorithm can receive input variables indicative of a short circuit. The input variables can include, for example, impedance, power, reactance, resistance, and the like as exhibited between the first and second terminals 64 and 66. The processor(s) 56 may covert or otherwise process the input variables to determine the presence of the short. The processor(s) 56 may utilize "if-then" rule(s) and a cut off to indicate the presence of the short.

Figure 8:
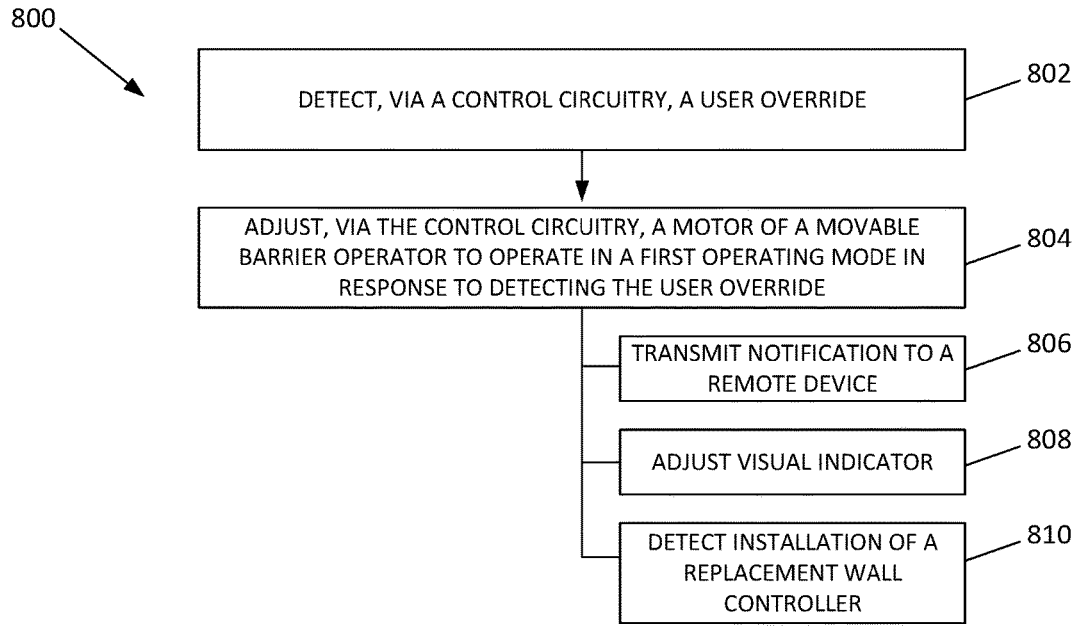
FIG. 8 is a flowchart of a method of adjusting an operating mode in the movable barrier operator in accordance with embodiments of the present disclosure.

FIG. 8 illustrates a flow chart of a method of overriding an operating mode of the movable barrier operator in accordance with an embodiment. In general, the method 800 will be described with reference to a system including the wall controller 40, the movable barrier operator 12, and the wire 116 described above with reference to FIGS. 1 to 5 and 7. In addition, although FIG. 8 depicts steps performed in a particular order for purposes of illustration and discussion, the method discussed herein is not limited to any particular order or arrangement. One skilled in the art, using the disclosure provided herein, will appreciate that various steps of the method disclosed herein can be omitted, rearranged, combined, and/or adapted in various ways without deviating from the scope of the present disclosure.

The method 800 can include detecting 802, via a control circuitry of the movable barrier operator, a user override. In one implementation, the user override can include a short formed between the first and second terminals of the wall controller inputs of the control circuitry. As described above, the user can install a wire at the wall controller inputs to short the first and second terminals of the wall controller inputs together and override the adjustment 610 (FIG. 6) of the movable barrier operator to the second operating mode. Installation of the short at the wall controller inputs may be performed after detecting 608 (FIG. 6) loss of communication with the wall controller.

Where the user override is a short, detecting 802 the user override can occur as a result of the control circuitry sensing a sudden decrease in resistance across the wall controller inputs, a current flow across the wall controller inputs, or the like. Reduced resistance and/or current flow across the wall controller inputs may occur as a result of a wire (short) installed between the first and second terminals. By sensing the change in resistance or current, the control circuitry can detect 802 the user override.

The method 800 can further include adjusting 804, via the control circuitry of the movable barrier operator, the motor of the movable barrier operator to operate in the first operating mode in response to detecting the user override. In implementations where the motor is controlled by a motor controller using PID control logic, the motor controller can adjust a relative amount of current flow to the motor in response to receiving an instruction, e.g., from the main controller of the control circuitry, to adjust 804 the motor to operate in the first operating mode. The motor controller can then operate the motor in the first operating mode to raise and lower the movable barrier until such time that the motor controller receives a subsequent instruction from the main controller to adjust the control mode of the motor. Thus, the movable barrier operator can continue operating in the first control mode indefinitely, or until such time that return to the second control mode is warranted (e.g., based on removal of the wire (short) from the wall controller inputs).

The method 800 can further include transmitting 806 a notification to a remote device, such as the remote server 70 or user device 71 (FIG. 2). The notification can include information regarding the status of the movable barrier operator, such as whether the movable barrier operator is operating in the first mode or the second mode. The notification can include information regarding the wall controller, the user override condition, the state of the wall controller input circuit, or the like. Transmitting 806 the notification to the remote server and/or user device may occur wirelessly through the network 55 or 72. In some instances, a user may utilize one or more applications through the user device to control functionality of the movable barrier operator in response to receiving the notification. For example, the user may approve or disapprove of the adjustment 804 to the first operating mode. If the user disapproves of the adjustment 804, the movable barrier operator may return to the second operating mode despite the presence of the user override. The remote server and/or user device may store information associated with the method 800, such as, for example, a log including the date and time when adjustment 804 to the operating mode was affected. This log may be accessible for inspection.

Figure 9:
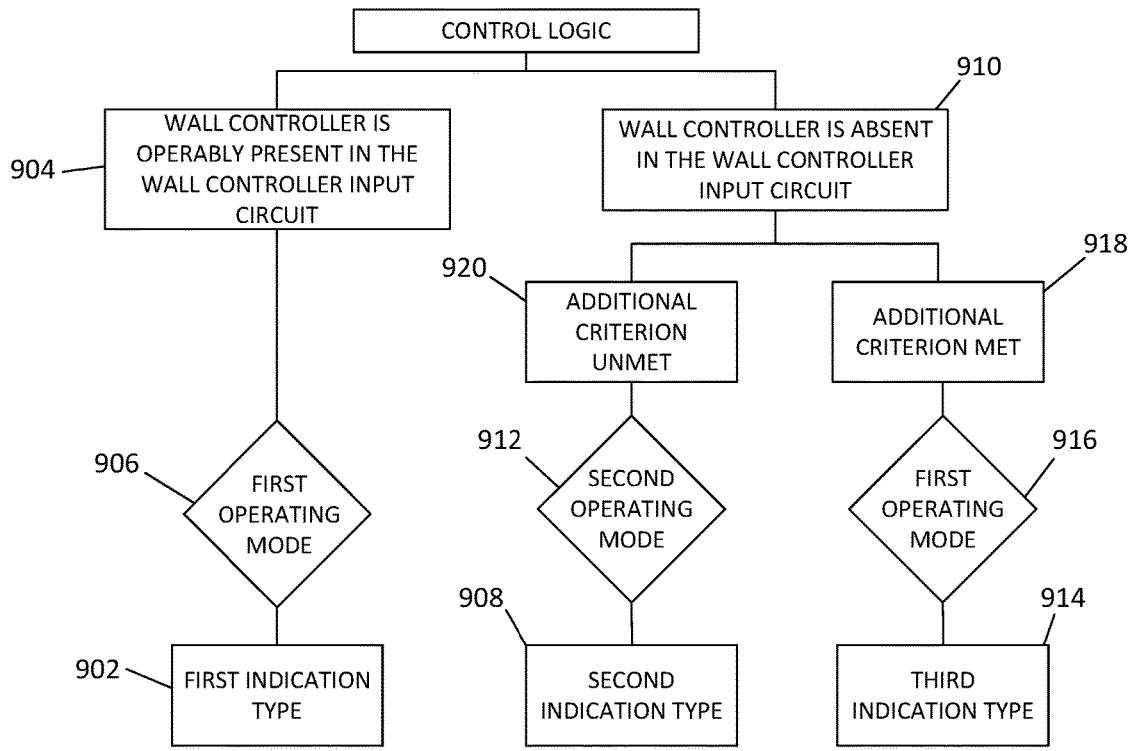
FIG. 9 is a diagram of controller logic for using indicators in accordance with embodiments of the present disclosure.

The method 800 can further include adjusting 808 an indicator, such as the visual indicator 112 (see FIGS. 2, 4, and 5). Adjusting 808 the indicator can include, for example, adjusting information displayed by the indicator to inform a user of a state of the operating mode of the movable barrier operator. For example, referring to FIG. 9, the indicator may be adjusted 808 to a first indication type 902 when the movable barrier operator is operating under normal conditions, i.e., the wall controller is operably present 904 and the movable barrier operator is operating in a first operating mode 906. The indicator may be adjusted 808 to a second indication type 908 when the movable barrier operator is operating under altered conditions, e.g., the wall controller is absent 910 and the movable barrier operator is operating in a second operating mode 912. The indicator may be adjusted 808 to a third indication type 914 when the wall controller is absent 910 and the movable barrier operator is operating in the first operating mode 916. The second and third indication types 908 and 914 can be affected by whether an additional criterion is met. The additional criterion may include the presence of a user override (e.g., a short between the first and second terminals of the wall controller input). When the additional criterion is met 918 (e.g., the user override is present), the indicator may be adjusted 808 to the third indication type 914. When the additional criterion is unmet 920 (e.g., the user override is absent), the indicator may be adjusted 808 to the second indication type 908.

The first, second, and third indication types can be presented by way of different patterns of illumination (e.g., different combinations of indicators being illuminated), different colors (e.g., a first color for the first indication type, a second color for the second indication type, and a third color for the third indication type, where the first, second, and third colors are different from one another), or the like. The user can refer to the indicator to quickly understand the current operating mode of the movable barrier operator.

The method 800 can further include detecting 810 installation of a replacement wall controller. As described above, the movable barrier operator can be utilized without the presence of the wall controller at the wall controller input circuit. Moreover, the movable barrier operator can be utilized in the first operating mode without the presence of the wall controller upon occurrence of a user override. However, in some instances, the user may reinstall the wall controller or install another wall controller in the system. For example, the original wall controller may be replaced as a result of breaking during normal operating use. The user can remove the broken wall controller from the system, override the movable barrier operator to operate in the first operating mode while the wall controller is absent from the system, and subsequently install a replacement (e.g., new) wall controller at a later time. The replacement wall controller may be electrically coupled to the movable barrier operator using the existing wires or new wires. The wires of the wall controller input circuit can be coupled to the replacement wall controller and to the first and second terminals of the wall controller inputs. In such implementation, it may be desirable to detect 810 the replacement wall controller to allow the user to control the movable barrier operator via the replacement wall controller.

Detecting 810 installation of the replacement wall controller may occur automatically upon installation of the wall controller in the wall controller input circuit and connection of the wall controller input circuit to the wall controller inputs on the movable barrier operator. For instance, resistance measured at the wall controller inputs may decrease in response to installing the replacement wall controller. In response to the detected increase in resistance, the control circuitry of the movable barrier operator can determine the presence of the replacement wall controller and restore operation of the movable barrier operator to the first operating mode. In some implementations, the detected resistance can be compared to a predetermined resistance value for determining the presence of the replacement wall controller. Once the replacement wall controller is installed, the movable barrier operator can be controlled by the replacement wall controller and operate in the first operating mode.

Further aspects of the invention are provided by one or more of the following embodiments:

Embodiment 1. A movable barrier operator comprising: a motor operably coupled to a movable barrier to control a position of the movable barrier; and control circuitry including wall controller inputs configured to be electrically coupled to a wall controller through a wall controller input circuit, wherein the control circuitry is configured to: receive a signal from the wall controller input circuit; determine that the wall controller is present in the wall controller input circuit based on the signal received from the wall controller input circuit; control the motor to operate in a first operating mode when the wall controller is determined to be present relative to the received signal; control the motor to operate in a second operating mode when the wall controller is determined to be absent relative to the received signal, the second operating mode different than the first operating mode; and control the motor to operate in the first operating mode when the wall controller is absent and an additional criterion is met.

Embodiment 2. The movable barrier operator of any one or more of the embodiments, wherein the motor is configured to move the movable barrier at a first speed in the first operating mode and a second speed in the second operating mode, and wherein the first speed is greater than the second speed.

Embodiment 3. The movable barrier operator of any one or more of the embodiments, wherein the additional criterion is indicative of a user override.

Embodiment 4. The movable barrier operator of any one or more of the embodiments, wherein the wall controller inputs comprise a first terminal and a second terminal, and wherein the additional criterion is a sensed short between the first and second terminals.

Embodiment 5. The movable barrier operator of any one or more of the embodiments, wherein the wall controller inputs comprise a first terminal and a second terminal, and wherein the additional criterion is comparison of a threshold resistance with a sensed resistance between the first and second terminals.

Embodiment 6. The movable barrier operator of any one or more of the embodiments, wherein the control circuitry comprises a main controller and a motor controller, wherein the main controller is configured to determine presence of the wall controller, and wherein the main controller is configured to communicate instructions to the motor controller to adjust performance of the motor between the first and second operating modes based on presence of the wall controller and the additional criterion.

Embodiment 7. The movable barrier operator of any one or more of the embodiments, wherein the control circuitry is configured to send a notification to a remote device after controlling the motor to operate in the second operating mode, the notification including information associated with operation of the motor in the second operating mode.

Embodiment 8. The movable barrier operator of any one or more of the embodiments, wherein the movable barrier operator comprises a visual indicator configured to display a first indication type when the wall controller is present, a second indication type when the wall controller is absent, and a third indication status when the wall controller is absent and the additional criterion is met.

Embodiment 9. A method of adjusting an operating mode of a movable barrier operator, the method comprising: detecting, via control circuitry of a movable barrier operator, operable communication with a wall controller, wherein the wall controller is electrically coupled to wall controller inputs of the control circuitry through a wall controller input circuit; controlling, with the control circuitry, a motor of the movable barrier operator to operate in a first operating mode in response to operable communication with the wall controller; detecting, via the control circuitry, a loss of communication with the wall controller; and adjusting, with the control circuitry, the motor to operate in a second operating mode in response to the detecting the loss of communication with the wall controller, the second operating mode different than the first operating mode.

Embodiment 10. The method of any one or more of the embodiments, wherein detecting the loss of communication with the wall controller comprises detecting the wall controller input circuit in an open circuit.

Embodiment 11. The method of any one or more of the embodiments, further comprising: detecting, via the control circuitry, a user override; and adjusting, via the control circuitry, the motor from the second operating mode to the first operating mode in response to the detecting the user override.

Embodiment 12. The method of any one or more of the embodiments, wherein the movable barrier operator comprises wall controller inputs configured to be in communication with the wall controller input circuit, wherein the wall controller inputs comprise a first terminal and a second terminal, and wherein detecting the user override comprises detecting a short between the first and second terminals.

Embodiment 13. The method of any one or more of the embodiments, wherein the movable barrier operator comprises a visual indicator configured to display a first indication type when the wall controller is in operable communication with the control circuitry, a second indication type when operable communication with the wall controller is lost, and a third indication type in response to detecting the user override.

Embodiment 14. The method of any one or more of the embodiments, further comprising: detecting, via the control circuitry, operable communication with a replacement wall controller in the wall controller input circuit while the motor is operating in the second operating mode; adjusting, with the control circuitry, the motor from the second operating mode to the first operating mode in response to detecting operable communication with the replacement wall controller.

Embodiment 15. The method of any one or more of the embodiments, further comprising transmitting, via the control circuitry, a notification to a remote device indicating that the motor is in the second operating mode.

Embodiment 16. A method of adjusting an operating mode of a movable barrier operator, the method comprising: controlling, with a control circuitry of the movable barrier operator, a motor of the movable barrier operator to operate at a first operating speed, the first operating speed being less than a second operating speed of the motor; detecting, via the control circuitry, a user override; and adjusting, with the control circuitry, the motor to operate at the second operating speed in response to detecting the user override.

Embodiment 17. The method of any one or more of the embodiments, wherein the control circuitry comprises wall controller inputs, the wall controller inputs configured to receive a wall controller input circuit coupled to a wall controller, and wherein detecting the user override comprises: detecting, via the control circuitry, a first value associated with a determined characteristic at the wall controller inputs while the motor operates at the first operating speed; detecting, via the control circuitry, a second value associated with the determined characteristic at the wall controller inputs, the second value different than the first value; and determining, via the control circuitry, occurrence of the user override based on detecting the second value.

Embodiment 18. The method of any one or more of the embodiments, wherein determining occurrence of the user override comprises: comparing, with the control circuitry, the second value to a threshold value; and determining, with the control circuitry, occurrence of the user override based on the comparing.

Embodiment 19. The method of any one or more of the embodiments, wherein the movable barrier operator comprises wall controller inputs configured to be in communication with a wall controller input circuit in communication with a wall controller, wherein the wall controller inputs comprise a first terminal and a second terminal, and wherein detecting the user override comprises detecting a short between the first and second terminals.

Embodiment 20. The method of any one or more of the embodiments, wherein controlling the motor to operate at the first operating speed comprises: detecting, via the control circuitry, operable communication with a wall controller, wherein the wall controller is electrically coupled to wall controller inputs of the control circuitry through a wall controller input circuit; controlling, with the control circuitry, the motor to operate at the second operating speed in response to detecting operable communication with the wall controller; detecting, via the control circuitry, a loss of communication with the wall controller; and adjusting, with the control circuitry, the motor to operate at the first operating speed in response to the detecting the loss of communication with the wall controller.

The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A movable barrier operator comprising:
   a motor operably coupled to a movable barrier to control a position of the movable barrier; and
   control circuitry including wall controller inputs configured to be electrically coupled to a wall controller through a wall controller input circuit,
   wherein the control circuitry is configured to:
   receive a signal from the wall controller input circuit;
   determine that the wall controller is present in the wall controller input circuit based on the signal received from the wall controller input circuit;
   control the motor to operate in a first operating mode when the wall controller is determined to be present relative to the received signal;
   control the motor to operate in a second operating mode when the wall controller is determined to be absent relative to the received signal, the second operating mode different than the first operating mode; and
   control the motor to operate in the first operating mode when the wall controller is absent and an additional criterion is met.

2. The movable barrier operator of claim 1, wherein the motor is configured to move the movable barrier at a first speed in the first operating mode and a second speed in the second operating mode, and wherein the first speed is greater than the second speed.

3. The movable barrier operator of claim 1, wherein the additional criterion is indicative of a user override.

4. The movable barrier operator of claim 1, wherein the wall controller inputs comprise a first terminal and a second terminal, and wherein the additional criterion is a sensed short between the first and second terminals.

5. The movable barrier operator of claim 1, wherein the wall controller inputs comprise a first terminal and a second terminal, and wherein the additional criterion is comparison of a threshold resistance with a sensed resistance between the first and second terminals.

6. The movable barrier operator of claim 1, wherein the control circuitry comprises a main controller and a motor controller, wherein the main controller is configured to determine presence of the wall controller, and wherein the main controller is configured to communicate instructions to the motor controller to adjust performance of the motor between the first and second operating modes based on presence of the wall controller and the additional criterion.

7. The movable barrier operator of claim 1, wherein the control circuitry is configured to send a notification to a remote device after controlling the motor to operate in the second operating mode, the notification including information associated with operation of the motor in the second operating mode.

8. The movable barrier operator of claim 1, wherein the movable barrier operator comprises a visual indicator configured to display a first indication type when the wall controller is present, a second indication type when the wall controller is absent, and a third indication status when the wall controller is absent and the additional criterion is met.

9. A method of adjusting an operating mode of a movable barrier operator, the method comprising:
   detecting, via control circuitry of a movable barrier operator, operable communication with a wall controller, wherein the wall controller is electrically coupled to wall controller inputs of the control circuitry through a wall controller input circuit;
   controlling, with the control circuitry, a motor of the movable barrier operator to operate in a first operating mode in response to operable communication with the wall controller;
   detecting, via the control circuitry, a loss of communication with the wall controller; and adjusting, with the control circuitry, the motor to operate in a second operating mode in response to the detecting the loss of communication with the wall controller, the second operating mode different than the first operating mode.

10. The method of claim 9, wherein detecting the loss of communication with the wall controller comprises detecting the wall controller input circuit in an open circuit.

11. The method of claim 9, further comprising:
    detecting, via the control circuitry, a user override; and
    adjusting, via the control circuitry, the motor from the second operating mode to the first operating mode in response to the detecting the user override.

12. The method of claim 11, wherein the movable barrier operator comprises wall controller inputs configured to be in communication with the wall controller input circuit, wherein the wall controller inputs comprise a first terminal and a second terminal, and wherein detecting the user override comprises detecting a short between the first and second terminals.

13. The method of claim 11, wherein the movable barrier operator comprises a visual indicator configured to display a first indication type when the wall controller is in operable communication with the control circuitry, a second indication type when operable communication with the wall controller is lost, and a third indication type in response to detecting the user override.

14. The method of claim 9, further comprising:
    detecting, via the control circuitry, operable communication with a replacement wall controller in the wall controller input circuit while the motor is operating in the second operating mode;
    adjusting, with the control circuitry, the motor from the second operating mode to the first operating mode in response to detecting operable communication with the replacement wall controller.

15. The method of claim 9, further comprising transmitting, via the control circuitry, a notification to a remote device indicating that the motor is in the second operating mode.

16. A method of adjusting an operating mode of a movable barrier operator, the method comprising:
    controlling, with a control circuitry of the movable barrier operator, a motor of the movable barrier operator to operate at a first operating speed, the first operating speed being less than a second operating speed of the motor, wherein the movable barrier operator comprises wall controller inputs configured to be in communication with a wall controller input circuit in communication with a wall controller, wherein the wall controller inputs comprise a first terminal and a second terminal;
    detecting, via the control circuitry, a short between the first and second terminals from a user override; and
    adjusting, with the control circuitry, the motor to operate at the second operating speed in response to detecting the user override.

17. The method of claim 16, wherein detecting the short comprises:
    detecting, via the control circuitry, a first value associated with a determined characteristic at the wall controller inputs while the motor operates at the first operating speed;
    detecting, via the control circuitry, a second value associated with the determined characteristic at the wall controller inputs, the second value different than the first value; and
    determining, via the control circuitry, occurrence of the short based on detecting the second value.

18. The method of claim 17, wherein determining occurrence of the short comprises:
    comparing, with the control circuitry, the second value to a threshold value; and
    determining, with the control circuitry, occurrence of the short based on the comparing.

19. The method of claim 16, wherein controlling the motor to operate at the first operating speed comprises:
    detecting, via the control circuitry, operable communication with the wall controller;
    controlling, with the control circuitry, the motor to operate at the second operating speed in response to detecting operable communication with the wall controller;
    detecting, via the control circuitry, a loss of communication with the wall controller; and
    adjusting, with the control circuitry, the motor to operate at the first operating speed in response to the detecting the loss of communication with the wall controller.

* * * * *